Figure 1:
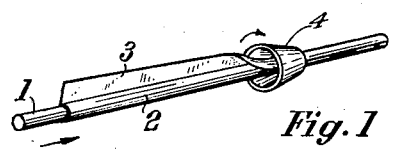

March 11, 1941.  W. FISCHER ET AL  2,234,523

INSULATED ELECTRICAL CONDUCTOR AND METHOD FOR ITS PRODUCTION

Filed Sept. 13, 1938

Inventors
Walter Fischer and
Kurt Otto
By Dowell & Dowell
their Attorneys

Patented Mar. 11, 1941

2,234,523

UNITED STATES PATENT OFFICE 2,234,523

INSULATED ELECTRICAL CONDUCTOR AND METHOD FOR ITS PRODUCTION

Walter Fischer, Furstenwalde, near Berlin, and Kurt Otto, Ketschendorf, near Berlin, Germany Application September 13, 1938, Serial No. 229,756
In Germany September 13, 1937

8 Claims. (Cl. 173—244)

This invention relates to insulated electrical conductors and methods of applying insulate thereto in production of the same.

In insulating electrical conductors, it is usual among other things to coat them with a layer of enamel. The layer of enamel is applied by passing the cleaned wire through a solution of the enamelling material so that it is covered completely with said solution. The solvent is then evaporated by the application of heat so that a thin film of enamel remains on the wire.

The present invention aims to provide a new and novel method of applying a film on the wire to be insulated. According to the invention, the film, produced in any suitable manner, is so placed around the conductor in band form that the edges of the band extend parallel or almost parallel to the axis of the conductor. Said film may in this process of application be united to the conductor by a direct body adhesion thereto, or the overlapping edges of the film may be connected together by adhesion so that, in either case, a closed sleeve is formed around the conductor.

The method according to the invention will be explained with reference to an example. A band of cellulose hydrate (Cellophane) $\frac{1}{100}$ mm. in thickness, together with the copper wire to be insulated, is passed through a nipple which folds the band around the copper wire. Instead of the nipple, however, there may be used a roller device consisting for example of three relatively displaced rollers, or rubber rollers, which place the band around the wire in the known manner. When the band of cellulose hydrate is moistened and itself passed in the moistened condition around the conductor so that its edges overlap thereon and the conductor, provided with the band folded thereon, is dried after leaving the nipple or the roller device, said band, in consequence of the contractional forces which arise during drying bears tightly upon and around the conductor. In other cases it is preferable to secure the film band on the conductor by an adhesive, for example by means of a rubber solution, applied simultaneously with its folding, which then at the same time imparts a good protection against moisture to the band. After final completion the conductor can be passed through a smoothing nipple.

Instead of the film of cellulose hydrate here described, it will be understood that other films may be used, for example those of cellulose acetate, cellulose triacetate, and the like. It is also possible to use foils of polyvinyl compounds such as polystyrol, polyvinyl chloride and the like. In the case of foils of thermoplastic material, it is advisable, when placing the foil around the conductor, to operate at increased temperature so as to obtain an easier shaping of the foil and an effective adhesion to the metallic (conductor) support. Polyvinyl compounds such as the above mentioned polyvinyl chloride, is particularly used when it is desired to obtain a protection against moisture or chemical actions.

As adhesive there may preferably be used a hardening artificial resin, for example the synthetic resin (consisting of phenol-aldehyde condensation product) known as "resol" and commonly identified by the word "Bakelite," which may however also be used in combination with films of other substances.

A process of placing the film around the conductor, which has proved satisfactory, will be described hereinafter. The usual adhesives, which may be used for securing the band to the conductor, have a series of disadvantages. When using an aqueous glue, and at the same time, as the band, one made by cellulose hydrate ("Cellophane"), the band is softened by the water and the operation of placing the band around the conductor is made unnecessarily difficult. When a rubber solution is used, there is the disadvantage that the band renders difficult the evaporation of the solvent, so that a firm adhesion of the band to the surface of the wire, or of one band upon another, is obtained only after a lengthy drying process.

According to the invention, thin bands of the above indicated materials are secured to the wire by means of a thermoplastic medium which is adhesive at high temperatures. The term "thermoplastic" here implies the property that the medium is liquid or plastic at a temperature which is higher than the temperatures of use of the wire. A medium of this character is for example bitumen. A copper wire which is to be enclosed in a thin film layer is first covered with a thin coating of bitumen, which may itself have a thickness of $\frac{1}{100}$ mm. or less. This coating may be effected by drawing the wire through hot bitumen and scraping off the excess bitumen by means of a suitable nipple. To the heated wire, thus coated with the adhesive bitumen, there is then applied the film band, which band is placed around the wire in such a manner that its edges overlap or abut against one another and extend parallel or almost parallel to the lineal axis of the conductor. As soon as the bitumen layer has cooled, it forms a solid layer which holds the film band thereto firmly. In this manner there is formed a film wrapped wire which externally cannot be distinguished from the ordinary enamelled wire produced by the solution process hereinbefore mentioned and of which the electrical and mechanical properties are not in any way inferior to those of this wire. On the other hand, the production of the wire of this invention can be carried out so simply and quickly that the wire possesses considerable commercial advantages as compared with the ordinary enamelled wire.

When the film band produced in the manner described from the above indicated substances is applied to the wire coated with bitumen or the like, care must be taken that at the overlapping point or points, proper adhesion of the edges of the band takes place. In Fig. 1 of the attached drawing 1 represents the wire which is coated with a thin layer of bitumen and is enclosed by the film 2 of cellulose. However, there is still to be secured at the overlapping point, a flap 3 of the band. It is preferable not to secure this flap to the band by hot bitumen, but to use a different adhesive process. A very simple way is to place the flap on the support by means of an aqueous glue and a rotating nipple represented by 4, which lays the flap as the wire and wrapping are drawn therethrough, at a point of the productive operation at which the bitumen layer has already hardened and the parts of the band which are directly in contact with the wire have already been firmly secured. In this manner the first adhesive operation is no longer influenced by the second.

The simplest method however is by entirely omitting the overlapping point and selecting or regulating the width of the film so accurately that the edges contact with one another without any gaps. This is particularly advisable when a number of layers of foil are applied one upon the other, in which instance it will be understood that the abutting points of the separate layers are relatively displaced. It is thus possible to apply one upon the other, in the manner indicated, any suitable number of layers according to the purpose of use which is intended. In this case the materials, such as polyvinyl chloride, which are neutral chemically, insoluble in water and insensitive to moisture, are preferably used, at least for the outer film layer.

Instead of bitumen which has been referred to mainly herein, it will be understood that it is also possible to use mixtures of bitumen with natural or artificial resins and waxes, as also the latter themselves insofar as they satisfy the required conditions.

The process of securing the film band by adhesion may also be carried out in such manner that a film band, which is coated on one side with the thermoplastic adhesive, for example bitumen, is placed around the wire in a heated state. In this case the band adheres firmly at the overlapping points without difficulties. The coating of the film band may be effected in the usual manner by means of a coating solution. For this purpose, a thin solution of bitumen in ethylene trichloride has been found to be satisfactory. It will be of advantage to cut the film band from large coated webs of film material.

Figure 2:
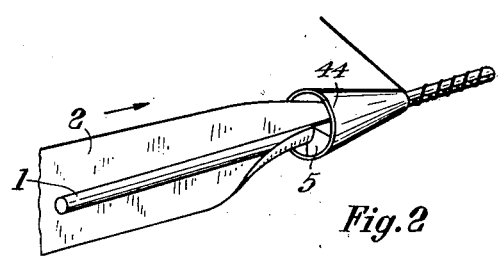

In Fig. 2 there is shown by way of another example an arrangement for coating wires or conductors according to the invention. In this view the conductor 1, with the film band 2, is passed in the direction of the arrow through a bath, not shown, of adhesive and thereupon through a nipple 44, while a guide 5 causes the film band with overlapping edges to pass foldingly into the nipple with appliance to the wire. Conductors wrapped with bands in this manner can be produced easily when the edges are also provided on the outside with an adhesive. This property can be used for applying by adhesive a further layer which is applied for example by spinning or longitudinal covering.

Figure 3:
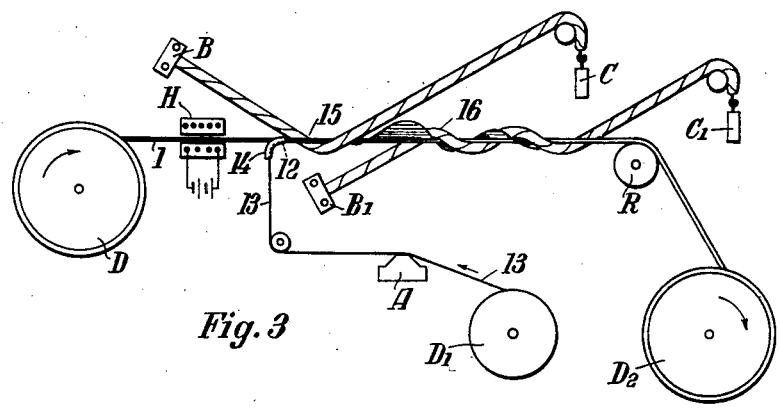

A device for carrying out the new process, which has proved to be particularly satisfactory, will now be explained with reference to Fig. 3, illustrating the same however only diagrammatically. In this latter view the metal conductor 1 is drawn from a supply drum D and preferably passes through known guiding devices, not shown, to a point of rewinding, or loading, later mentioned. After first passing through a heating device H, if so desired for heated application, it passes to a special guide 14, which at the point 12 supplies a more or less wide film band 13 from a supply drum $D_1$ and applies said band with one edge running substantially parallel with the axis of the conductor. This film band 13 may be previously coated with an adhesive by means of an applying device A, known in many branches of industry, on one side which is subsequently turned through the guide 14 towards and in contact with the conductor. By said device there may be applied for example bitumen dissolved in a solvent. The solvent evaporates in the passage of the film from the applying device A to the guide 14, so that only a very thin bitumen layer remains, which when heated, particularly by the heat supplied to the wire 1 by means of the device H, becomes adhesive. It is, however, also possible to use other adhesives.

After the film band 13 is applied at 12 substantially tangentially or parallel to the conductor, it reaches a guide and pressing device which in the example shown consists of a cord 15, of elastic material, which at B is secured at one end and, by means of a weight C or the like attached to its other end, is held slightly tightened and with a spiral turn or twist surrounds or substantially surrounds the conductor. The arrangement is such that the guide device 15 first meets the band 13 at a point between its two lateral edges and then presses it at this point lightly against the conductor and thereupon gradually (by virtue of surrounding the conductor) passes it spirally or foldingly around the conductor towards one edge—in the example towards the right hand edge—so as to fasten or begin to fasten it to the film. The pitch of the guide member in its spiral around the conductor will depend upon the width of the film band applied around the latter, the same being much greater or more gradual and extended for a relatively wide band than for a narrow one. In fact, it may extend to considerable length in one single or a mere partial turn around the conductor.

Instead of a single device 15 it is possible to arrange a number of these pressing devices (cords) in series and/or with more than one spiral turn around the conductor, which effect the light pressing in stages or continuously. The shown duplicate cord 16, having several spiral turns around the wrapped wire, although here employed for a different purpose later described and although shown to be wound in the opposite rather than the same direction nevertheless serves as an illustration of an additional and more than one spiral turn of guide 15 around the conductor, the said duplicate (considered as another guide 15) having a duplicate end-fastening B₁ and a duplicate opposite end tensioning weight C₁ corresponding with B and C respectively of the other or first described guide. Ordinarily however, a single spiral turn around the wire will be preferred, whether one or more of such pressure devices 15 is used. By the action of the heating device H, or of the adhesive application by the device A, or both, the film band pressed against the conductor by said guide or guides adheres firmly thereto.

The device 15 just described does not present any appreciable opposition to the movement of the structure in consequence of the lightly applied pressure and the slight coefficient of friction between the pressing cord and the film skin. These factors have little if any interfering effect and in spite of them the film skin is wrapped and fastened down upon the wire smoothly and securely, right up to the edge.

Further describing said device, the united wire and film as operated upon by the one or more guides 15 then pass through a further or "follow-up" guide such as is primarily illustrated by the cord 16, which as already described consists of a weakly tensioned strand secured at one end by B₁ and having its other end lightly tensioned by a weight C₁. This guide or cord 16, like the one or more guides 15, is also spiraled around the wrapped wire, in this instance for several turns, but for the specific purpose for which it is here in employed is wound in the opposite direction to the device or devices 15, and encloses the wrapped conductor wire in a complete or in a number of succeeding spiral turns. Thus, whereas the device 15 presses on the right hand edge of the film band, the follow-up device 16 contradistinctively presses or serves to place the left hand edge with slight pressure around the conductor, the width of the band being such that if desired it can be passed around the wire a number of times. The pitch of this follow-up guide 16, like the first described guide 15, in its spiral around the conductor may depend upon the width of the film band applied around the latter, being much greater or more extended in the case of a wide band to be wrapped around it than in the case of a narrow one. In some cases it may extend to a very considerable length in only a few gradual turns around the conductor.

Instead of the guide 16, there may be used a number of pressure guides, like the cord 15 for instance, acting progressively in the same manner, which, similar to the device 15 as shown, always preferably embrace the conductor along only a short spiral line.

The device or devices 16 are so arranged that they act progressively on a part of the band from an edge which has already been secured by the device 15, towards the other or unsecured edge, which in the illustration shown is the left hand edge.

After leaving the device 16, the conductor passes over a guide roller or a plurality of guide rollers R to a winding drum D₂, as a completely insulated wire. The guides 15, 16 as before indicated consist of bands, cords or threads of materials which are suitable for pressing the sensitive foil with a light pressure against the conductor. Thus for example cords, profiled string, or bands of any suitable cross-section or material, for example cotton or other fibrous substances, or of rubber, leather and the like can be used. The pressing of the guide is preferably effected in such a manner that the guiding band or the guiding cord is held tensioned for example by a suspended free weight.

As hereinbefore previously stated, the film band can be coated with bitumen or the like as the adhesive. In this case the wire is allowed to run into the guide devices while hot or heated from the heater H, so that the film with the cooled adhesive will be placed entirely firmly on the conductor.

It is of particular importance that it shall be possible with the device, according to the invention, to produce in the simplest manner a conductor with a multi-layer insulation. For this purpose the width of the film band is preferably so dimensioned or regulated that the band can be placed two or more times around the conductor so that the conductor will be produced with a two or multi-fold insulation layer in a single operation and with the use of only a single foil.

Whereas in the usual mere enamelling processes the speed of the working is comparatively low, the operation in accordance with the present invention may be carried out very rapidly. This renders the process according to the invention particularly suitable for the production of electric copper conductors insulated with rubber, wherein in place of the usual tinning there is applied an enamel-like layer or coating to the copper conductor. According to a further feature of the invention, the device herein described for enclosing conductors within a thin film is, or may be, placed directly in front of the coating machine or the spraying machine which applies the rubber insulation to the conductor. In this case it is generally not necessary to so firmly stick the film onto the bare copper conductor, or to stick the two edges thereof together thereon, as the rubber layer firmly presses together the overlapping edges of the film band.

The process according to the invention for coating a conductor has the further advantage that the thin protecting layer, when desired to expose the ends of the conductor, can be conveniently removed from the conductor with a few manipulations. When for example the conductor has been produced with rubber insulation applied over a thin film coating or wrapping according to the invention, instead of tin, the film can be removed from the bare conductor simultaneously with the rubber. The use of an insulating foil instead of tin in the case of rubber covered conductors has the still further advantage that the thickness of the rubber need not be made as great as was usual hitherto. Thus, for example, in the production or installation of cable it is sufficient when using the wire insulated according to the invention, for a single rubber layer to be applied thereover by means of the coating machine, whereas it was hitherto necessary to apply two layers of rubber.

The conductor thus produced can also be enclosed either in weaving or by a woven band and a number of conductors can be combined into a multi-conductor cable.

It is possible by this invention and a correct selection of the adhesive and of the wrapper foil to produce a film wrapped wire or conductor which is the substantial equivalent of an enamelled wire, but which will have electrical properties to some extent superior to those of truly enamelled wires produced by the usual processes.

Also by suitable selection of the color of the adhesive and of the film, or the mixture of color pigment therewith, a film wrapped wire of any color can be produced, the colors being more pronounced than those of the usual enamelled wires since the adhesive and the material of which the applied foil consist hold the color better than mere coloring in an enamel coating. It may also be mentioned here that defects in the wire produced by the process of this invention are less than those of any ordinary enamelled wire. Wires with a single or two layers of film secured thereto by adhesion fall within the same range of use as enamelled wires and switch wires and, in a way similar to these, may be enclosed in a sheath of cotton or a rubber layer or the like. When two or three layers of film are applied to the wire there is thereby obtained such a resistant insulation that the wire of this character can be used directly in place of the usual rubber coated wires for installation cables, namely when at least the outer layer or the outer layers are produced from a material which is insensitive mechanically and to moisture. It is also possible with advantage to apply these insensitive layers alternatively with layers which have particularly high di-electric properties. It is also possible by such means to influence the di-electric properties by selecting different thicknesses for the separate layers, particularly by increasing the thickness of the layer from the inside outwardly. If necessary, it is also possible to apply or secure by adhesive on the outer layer a band of cotton, or to apply thereto a thin water-repelling layer, such as wax or the like. The greater the number of applied layers, the greater will be the mechanical strength and the di-electric property. It is also possible, with a suitable selection of the film material and of the adhesive, to produce in the manner described resistant high tension conductors capable of withstanding high strain more cheaply than the usual paper insulation. Conductors according to the invention have also the advantage, with a suitable selection of the material, of being entirely non-hydroscopic, for which reason it is possible when assembling a number of these conductors into a cable to do this without lead sheathing. It may also be mentioned that the flammability of such an insulation is not measurably substantial and by the addition of known means to the adhesive and to the film material may be almost completely eliminated.

A wire according to the invention can also be used with advantage as a conductor which is not attacked by ozone, especially for purposes of high voltage which is very resistant to corrosion and has a high resistance to leakage. The insulation of the conductor, which may be a solid conductor or wire, consists of a large number of very thin layers of a Cellophane film which are secured one on the other by adhesive. Any suitable number of films may be used and the number depends upon the electrical conditions. For example, two to four films of a thickness of $\frac{1}{100}$ to $\frac{3}{100}$ mm. may be used. The number of layers may however be suitably increased. In the simplest way a conductor with four layers is produced by placing two bands around the conductor, each of which passes around the conductor twice.

Wires insulated according to the invention are suitable in excellent manner for the construction of multi-conductor installation cables. Multi-conductor installation cables are in general produced by binding together a number of rubber-insulated conductors, providing them with a common filling and enclosing them in a protecting sheath consisting either of an extruded artificial material or a pleated sheet metal casing which may be provided with a protection against corrosion. According to the invention the insulated conductor in such a multi-conductor installation cable does not consist of rubber but of a number of layers of thin film which are secured on one another by adhesive. There may be any suitable number of films and the number depends upon electrical conditions. There can be used for example two to four films with the thickness of $\frac{1}{100}$ to $\frac{3}{100}$ mm. The number of layers may be suitably increased. For a series of purposes of use a single layer is sufficient. The separate conductors of a multi-conductor installation cable can be rendered different from one another in that at least the uppermost layer is differently colored from one conductor to the next. Further, when using a number of film bands these may be simultaneously secured by adhesion to the conductor. The various film bands can also be secured together by adhesive before being applied to the conductor.

We claim:

1. The method of applying a thin film insulation to an electric conductor wire, which consists in drawing a length of the wire continuously along a lineal path, heating the wire as it is drawn along said path, contacting the heated wire longitudinally with a ribbon band of thin film insulating material continuously drawn forward therewith along the same lineal path, the said band being coated upon its contacting side with a thermoplastic adhesive becoming adherent only under the action of heat and being contacted with said wire with its edges disposed substantially parallel to the axis of the wire, and passing the thus contacted wire and film band together through means helically engaging therearound with a light pressure acting to first lay and press one marginal portion and edge of the band upon the wire and then to lay and press the opposite marginal portion and edge of the band upon the wire in a complete circumferential wrapping around the wire with said edges engaging one another and with both of the edges still running lengthwise of the wire substantially parallel with its axis.

2. The method of covering an electric conductor wire with a thin film insulation, which consists in drawing the wire lengthwise continuously along a lineal path, passing the wire as it is so drawn through a heating medium temporarily heating the same, contacting the heated wire longitudinally with a thin film band of the insulating material continuously drawn forwardly therewith from the contacting path along the same lineal path, the said band being coated upon its contacted side with a thermoplastic adhesive becoming adherent only under the action of heat and being contacted with said wire with its edges disposed substantially parallel to the axis of the same, passing the thus contacted wire and film band together through means helically engaging therearound with a light pressure acting to first lay one marginal portion and edge of the band upon the wire and then to lay and press the opposite marginal portion and edge of the band upon the wire in a complete circumferential wrapping around the latter with said edges of the band running lengthwise of the wire substantially parallel with its axis, and maintaining the heat of the wire meanwhile sufficient to ensure a firm adhesion of the wrapped band thereto.

3. The method of covering an electric conductor wire longitudinally with thin film bands or ribbons of insulating material in layers so as to surround the wire with their longitudinal edges running substantially parallel to the axis of the wire, which consists in bringing a selected band of the said material successively one upon another into superposed contact with the wire in the direction of the latter's length and close to one of the marginal edges of the former, the said band of each layer being surfaced on its contacting side only with a thin coating of a thermoplastic adhesive becoming adherent only under the action of heat, laying the said named marginal edge of the band down upon the wire by a light pressure application thereagainst, and then under a continuous light pressure gradually and progressively bringing the opposite portion and edge of the band into contact with and around the wire circumferentially by engaging means which said engaging means surrounds the said wire and band in the form of a steep helix, the laying of the first marginal edge and the subsequent laying or enwrapping of the second marginal portion and edge of the band upon the wire being both performed in the presence of heat at a temperature at which the aforesaid thermoplastic adhesive is adherent.

4. The method of covering an electric conductor wire with a thin film insulation, which consists in drawing the wire lengthwise along a lineal path, passing the wire as it is so drawn through a heating medium temporarily heating the same, contacting the heated wire longitudinally with a thin film band of insulating material drawn forward therewith from the contacting point along the same lineal path, the said band being coated on its contacting side with a thermoplasic adhesive becoming adherent only under the action of heat and being contacted with said wire with its edges disposed substantially parallel to the axis of the wire, engaging the band helically in opposite directions around the wire with a light pressure so as to gradually and progressively lay and press first one marginal portion and edge and then the opposite marginal portion and edge thereof upon the wire in a complete circumferential wrapping around the wire with its said two edges still extending lengthwise of the wire substantially parallel with the latter's axis, and maintaining the heat of the wire meanwhile sufficient to ensure a firm adhesion of the wrapped band to the wire.

5. The method of covering an electric conductor wire with a thin film insulation, which consists in drawing the wire lengthwise along a lineal path, passing the wire as it is so drawn through a heating medium temporarily heating the same, contacting the heated wire longitudinally with a thin film band of the insulating material drawn forward therewith from the contacting point along the same lineal path, the said band being coated on its contacting side with a thermoplastic adhesive becoming adherent only under the action of heat and being contacted with said wire with its edges disposed substantially parallel to the axis of the same, passing the thus contacted wire and film band together through a light pressure engaging means helically disposed therearound in one direction so as to first lay and press one marginal portion and edge of the band upon the wire and then passing the wire and band together through another light pressure engaging means helically disposed therearound in the opposite direction so as to lay and press the opposite marginal portion and edge of the band upon the wire in overlap of the other in a complete circumferential wrapping of the wire and with the said two edges of the band running still lengthwise of the wire substantially parallel with its axis, and maintaining the heat of the wire meanwhile sufficient to ensure a firm adhesion of the wrapped band thereto.

6. The method of covering an electric conductor wire with a thin film insulation therearound, which consists in drawing the wire lengthwise along a lineal path, contacting the wire as it is so drawn longitudinally and in the direction of its movement with a thin film band or ribbon of insulating material drawn forward therewith from the contacting point along the same lineal path, the said band being coated on its contacting side with a thermoplastic adhesive becoming adherent only under the action of heat and being contacted with the wire at an offset from longitudinal center close to one of the marginal edges thereof and with both said edges extending substantially parallel to the axis of the wire, applying heat to at least one of said contacted elements prior to their actual contact one with the other so that said contact is caused to be effected under the effect of heat sufficient to produce adhesion between the two, passing the thus contacted wire and film band together through a light pressure engaging means helically disposed therearound in one direction so as to first lay and press the nearer marginal edge of the band upon the wire and then passing said wire and band together through another light pressure engaging means helically disposed therearound in the opposite direction so as to gradually and progressively lay and press the opposite marginal portion and edge of the band upon the wire in a complete circumferential wrapping around the wire and with the two said edges of the band running still lengthwise of the wire substantially parallel with its axis, and maintaining the heat applied to one of said contacted elements meanwhile or during said laying and pressing operations sufficient to ensure a firm adhesion of the wrapped band to the wire.

7. A device for applying a band or ribbon of insulating material to an electric conductor wire, comprising means drawing or feeding the wire longitudinally along a lineal path, means training or feeding the band or ribbon of insulating material into contact longitudinally with the wire at a point along the former's said path of movement so as thenceforward to be carried along and in continued contact therewith, means applying heat to one of said fed elements in advance of their points of contact with each other, means following the contact of the wire and band with each other engaging helically therearound in one direction and acting with a light pressure on one marginal portion and edge of the band or ribbon so as to lay and press the same around and upon the wire in one encirclive direction, and means thereafter similarly engaging helically around the wire and band in the opposite direction and acting with a light pressure on the opposite marginal portion and edge of the band or ribbon so as to lay and press the latter around and upon the conductor in the opposite encirclive direction.

8. A device according to claim 7, wherein the two last-named helically engaging means each comprise flexible strand-like guiding members encircling the wire and contacted band or ribbon along the lines of a steep helix and bear against the outer sides of said band or ribbon one behind the other around the entire circumference of the wire at least once completely in such manner as to press the said band with a light pressure around the entire periphery of the wire, the direction of their wind with respect to the feeding movement of the said wire being such as to act successively upon opposite parts of the band or ribbon in opposite encirclive directions and the pitch of their wind being such that the parts of said band or ribbon which are remoter from its edges are first engaged thereby with a gradual turning effect as the band or ribbon is drawn with the wire therethrough.

WALTER FISCHER.
KURT OTTO.